United States Patent

Didinsky et al.

[19]

[11] Patent Number: 6,108,593

[45] Date of Patent: *Aug. 22, 2000

[54] METHOD AND APPARATUS FOR ESTIMATING ATTITUDE SENSOR BIAS IN A SATELLITE

[75] Inventors: Garry Didinsky, Los Angeles; Yeong-Wei Andy Wu, Rancho Palos Verdes, both of Calif.

[73] Assignee: Hughes Electronics Corporation, El Segundo, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/891,418

[22] Filed: Jul. 9, 1997

[51] Int. Cl.$^7$ .............................. G06F 7/00; G05D 3/00
[52] U.S. Cl. .................................... 701/13; 701/3; 701/4; 244/169; 244/171; 244/165; 244/166; 342/352; 342/355; 342/77
[58] Field of Search ............................ 701/3, 4, 13, 220, 701/221, 222, 226, 223; 244/164, 165, 171, 172, 173, 169, 3.21, 3.22, 3.16, 357.14, 357.11; 342/77, 355, 357, 62, 76, 81, 95, 96, 97, 352, 354

[56] References Cited

U.S. PATENT DOCUMENTS

| | | |
|---|---|---|
| 3,866,025 | 2/1975 | Cavanagh .................................. 701/13 |
| 3,937,423 | 2/1976 | Johansen ................................ 244/3.22 |
| 3,998,409 | 12/1976 | Pistner ....................................... 701/13 |
| 4,071,211 | 1/1978 | Muhlfelder et al. ...................... 701/13 |
| 4,807,835 | 2/1989 | Fowler .................................... 244/166 |
| 5,100,084 | 3/1992 | Rahn et al. ............................. 701/226 |
| 5,222,023 | 6/1993 | Liu et al. .................................. 701/13 |
| 5,225,885 | 7/1993 | Beard et al. ........................ 356/139.01 |
| 5,337,241 | 8/1994 | Takahashi ................................... 701/4 |
| 5,400,033 | 3/1995 | Hablami ..................................... 342/95 |
| 5,452,869 | 9/1995 | Basuthakur et al. ...................... 701/13 |
| 5,485,156 | 1/1996 | Manseuer et al. ........................ 342/77 |
| 5,546,309 | 8/1996 | Johnson et al. ........................... 701/13 |
| 5,556,058 | 9/1996 | Bender ................................... 244/171 |
| 5,687,933 | 11/1997 | Goodzeit et al. ........................ 244/169 |
| 5,698,842 | 12/1997 | Fallon et al. .......................... 250/203.4 |
| 5,721,431 | 2/1998 | Herson et al. ........................... 250/342 |
| 5,738,309 | 4/1998 | Fowell ................................... 244/171 |
| 5,806,804 | 9/1998 | Goodzeit et al. ........................ 244/169 |
| 5,862,495 | 1/1999 | Small et al. .............................. 701/13 |
| 5,899,945 | 5/1999 | Baylocq ................................... 701/13 |
| 5,914,483 | 6/1999 | Fallon et al. .......................... 250/203.4 |
| 5,931,421 | 8/1999 | Surauer et al. .......................... 244/165 |

*Primary Examiner*—Jacques H. Louis-Jacques
*Attorney, Agent, or Firm*—T. Gudmestad; M. W. Sales

[57] ABSTRACT

A method and apparatus for estimating attitude sensor bias in a satellite system uses attitude sensors and a spacecraft control processor. Attitude sensors provide output signals, which may contain bias. The present invention interprets the signals, determines the bias present in the signals, and generates an output signal to offset the bias in the signals from the attitude sensors, thereby leading to more accurate positioning of the satellite employing the present invention.

18 Claims, 5 Drawing Sheets

METHOD AND APPARATUS FOR ESTIMATING ATTITUDE SENSOR BIAS IN A SATELLITE

BACKGROUND OF THE INVENTION

1. Field of the Invention

The present invention relates generally to satellite attitude sensor bias estimation and, more particularly, to a method and apparatus for estimating and nulling attitude sensor bias.

2. Description of Related Art

The term attitude is used to describe the orientation of an object with respect to a reference orientation. Attitude is of particular interest in satellite operations. For example, if a satellite is to be used in a communications application, it is necessary that the satellite be oriented in the proper direction to receive and/or transmit relevant information for the communication link. The attitude of a satellite is determined by computations based on the output of attitude sensors located on the satellite. Attitude sensors monitor the position of reference objects, which may include the sun, the earth, constellations, or beacons. For example, a spacecraft may have two sensors, one monitoring the sun and one monitoring the earth. It is well known that given position information from two reference objects (e.g., the sun, the earth, stars, or beacons), it is possible to determine spacecraft attitude.

Due to external and internal factors, the attitude sensor outputs may become biased. For example, thermal expansion and contraction of the spacecraft may move the sensors, thereby biasing the sensors by moving the reference frame of the spacecraft from the intended position. Attitude sensors may also be susceptible to electrical noise. Movement of sensors and electrical noise can lead to errors in the calculation of the spacecraft attitude.

Known methods of keeping bias and noise to a minimum typically involve extensive attitude sensor calibration and tight thermal control of the sensor mounting structure. These methods are tedious, time consuming, and expensive. Therefore, it is desirable to have a method and apparatus for removing attitude sensor bias and noise that eliminates the need for time consuming and expensive sensor calibration and thermal control of sensor mounting.

SUMMARY OF THE INVENTION

The present invention may be embodied in a method and apparatus for removing bias from attitude sensor measurements. In contrast to known methods, the method and apparatus of the present invention addresses the problem of attitude sensor bias by correcting and/or offsetting any bias that may be present in the attitude sensor measurements. In general, the method involves continuously estimating the amount of bias present in the attitude sensor outputs, then adjusting the attitude sensor outputs by an amount sufficient to compensate for the estimated bias.

Preferably, the invention is embodied in an otherwise conventional satellite or spacecraft having attitude sensors, a spacecraft control processor and actuators. The attitude sensors generate attitude-related position information which typically includes the position of the spacecraft with respect to at least two reference objects (e.g., the earth and the sun, or two distinct stars). The spacecraft control processor receives the attitude-related position signals from the attitude sensors and generates attitude control signals that are converted to torque commands and fed to the actuators. The actuators respond to the torque commands to make whatever adjustments are needed, if any, to the spacecraft attitude.

According to the present invention, the spacecraft control processor incorporates several functional blocks or sections that cooperate to generate the bias offsets. These functional blocks can be implemented as software operations, hardware logic circuitry, firmware, or any combination thereof. The functional blocks include a bias correction block, a bias estimation block, a measurement processing block, and an attitude correction block. The bias correction block receives inputs from the attitude sensors and the bias estimation block. The inputs from the attitude sensors are adjusted by an amount appropriate to offset whatever bias may be present in those signals. The bias correction block makes the above-referenced adjustments based on the bias-estimation information received from the bias estimation block. The measurement processing block receives the bias-corrected attitude-related position signals from the bias correction block and generates attitude control signals that are provided via an attitude correction block to the spacecraft attitude control. Optionally, the attitude control signals from the measurement processing block could be provided directly to the spacecraft attitude control block. In either event, the spacecraft attitude control block converts the received attitude control signals to torque commands which are fed to actuators external to the spacecraft control processor. The actuators respond to the torque commands to make whatever adjustments are needed, if any, to the spacecraft attitude.

Referring back to the bias estimation block, it receives information from the measurement processing block and uses that information to generate bias estimation signals, which are provided to the bias correction block. The information received from the measurement processing block includes the attitude measurement signals provided to the attitude correction block, along with "residual" signals. The measurement processing block derives these residual signals from the bias-corrected signals received from the bias correction block, and the attitude reference source signals received from an attitude reference source. Accordingly, a "feedback loop" is formed from the bias correction block to the measurement processing block to bias estimation block and back to the bias correction block. Thus, current bias-corrected outputs from the bias correction block are part of the information used to derive future bias offsets.

The invention itself, together with further objects and attendant advantages, will best be understood by reference to the following detailed description, taken in conjunction with the accompanying drawings.

DESCRIPTION OF PREFERRED EMBODIMENT

The present invention may be embodied in a method and apparatus that estimates and offsets bias that exists in an attitude determination system. Biased attitude sensor signals and reference measurements are fed to a measurement processing block, which calculates measurement residuals that are fed to a bias estimation block. The reference measurements are based on calculations which predict the position of the reference objects (e.g., the sun and the earth) based on the date and time. The bias estimation block generates signals which offset the bias present in the signals from the sensors, thereby eliminating the need for time consuming and expensive sensor calibration and thermal controls.

Figure 1:
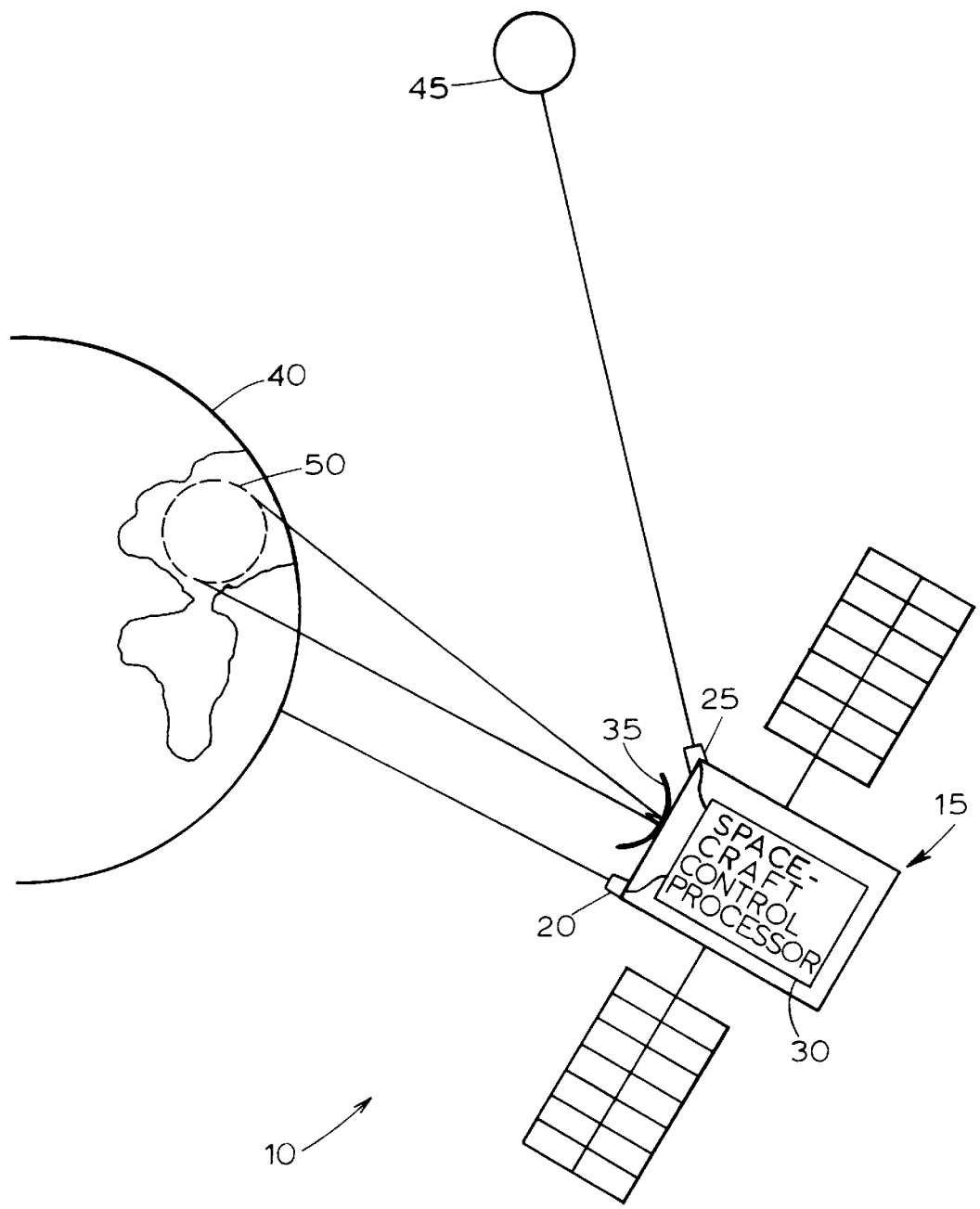
FIG. 1 is an illustration of a satellite system in which the present invention may be implemented.

Referring now to FIG. 1, a satellite system 10 in which the present invention may be implemented is shown. The satellite system 10 includes a satellite 15, which further includes an earth sensor 20, a sun sensor 25, a spacecraft control processor 30, and an antenna 35. The earth sensor 20 and the sun sensor 25 sense the attitude of the satellite 15 with respect to the earth 40 and the sun 45. The earth sensor 20 and the sun sensor 25 are only two examples of attitude sensors, and other types of attitude sensors may be used in attitude determination systems. Alternatively, attitude sensors may use beacons, constellations, or other heavenly bodies as reference objects. The outputs from the attitude sensors 20, 25 are fed to the spacecraft control processor 30, which is responsible for attitude determination and adjustment. It may be critical for the satellite 15 to maintain proper attitude in order to keep the earth footprint 50 of the antenna 35 in a desired location to provide satellite coverage to a particular geographical area.

Figure 2:
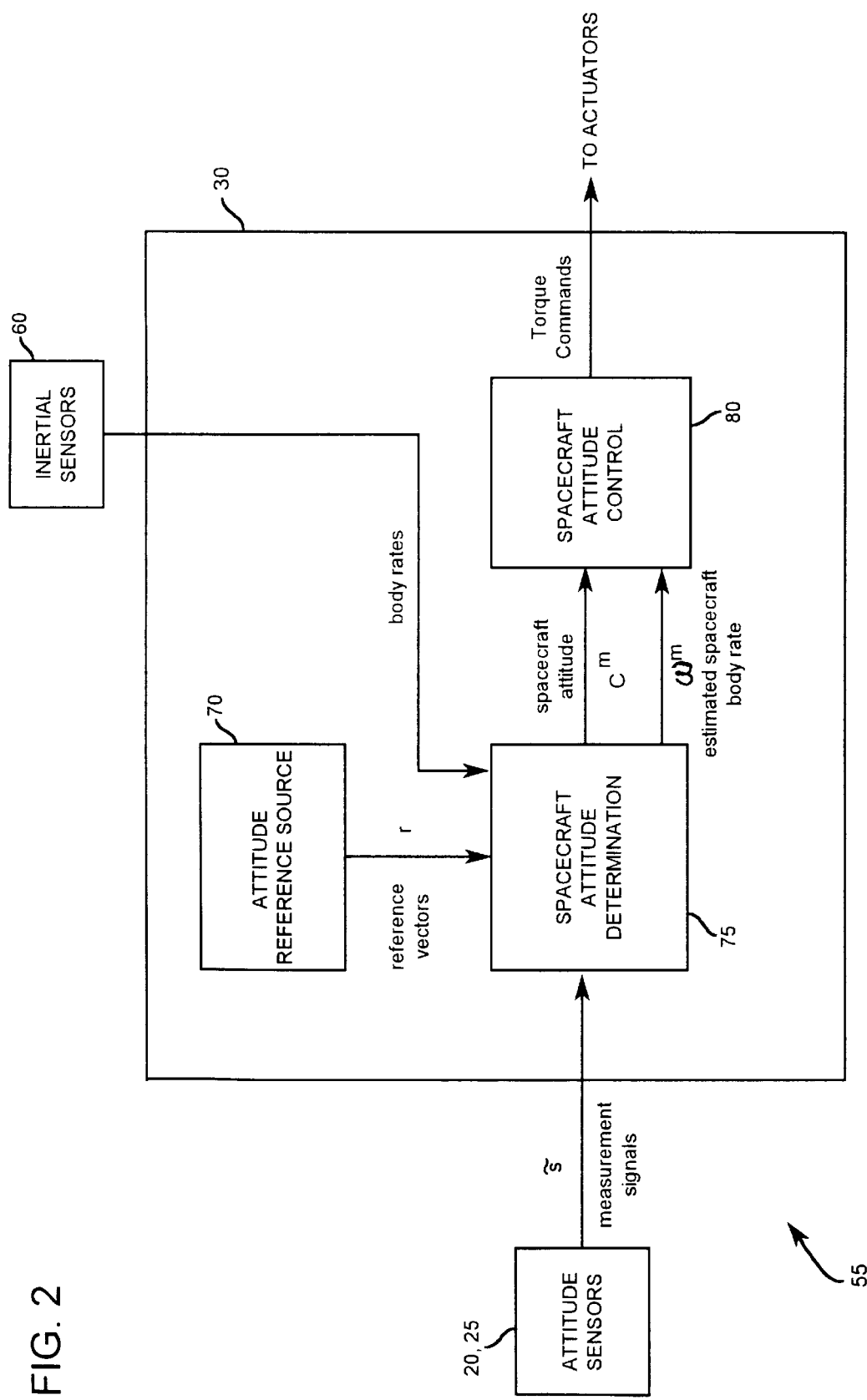
FIG. 2 is a block diagram of the satellite control processor portion of the satellite system shown in FIG. 1.

FIG. 2 is a block diagram of a spacecraft attitude determination and control function 55 embodying the present invention, comprising attitude sensors 20, 25, inertial sensors 60, and a spacecraft control processor 30. The attitude sensors 20, 25 and the inertial sensors 60, along with the spacecraft control processor 30 make up the hardware components of the spacecraft attitude determination and control function 55. The functional blocks, which will be subsequently described as residing within the spacecraft control processor 30, may be software functions. Alternatively, the functional blocks within the spacecraft control processor 30 may be hardware implementations of the described functions. Hardware implementations of the functions may utilize technology such as application specific integrated circuits (ASICs). The attitude sensors 20, 25 are capable of monitoring and tracking the position of reference sources such as the sun, the earth, or constellations. The inertial sensors 60 may be gyroscopes or any other mechanisms capable of measuring acceleration and body rates. The sensors 20, 25, and 60 are mounted in a conventional manner to a satellite structure (not shown). The output of the attitude sensors 20, 25 are vectors $\bar{s}$ from the sensors 20, 25 to the reference sources, which in this case are the earth 40 and the sun 45. The sensor outputs are fed to the spacecraft control processor 30.

The spacecraft control processor 30 includes an attitude reference source 70, a spacecraft attitude determination block 75, and a spacecraft attitude control block 80. The attitude reference source 70 performs the function of providing reference signals r, regarding the position of the reference sources 40, 45 to the spacecraft attitude determination block. The attitude reference source 70 is preferably embodied in a system using position calculations based on the date and time such as ephemeris, which is well known in the art. Additionally, various other methods of providing attitude reference sources are well known in the art.

The spacecraft attitude determination block 75 outputs a spacecraft attitude measurement ($C^m$) and an estimated spacecraft body rate ($w^m$) to the spacecraft attitude control block 80. The spacecraft attitude control block 80 uses attitude and body rate inputs to generate a set of spacecraft torque commands which are fed to actuators (not shown). The actuators are used to alter the attitude of the spacecraft in response to torque commands, and may be devices such as reaction wheels, torquers, and thrusters.

Figure 3:
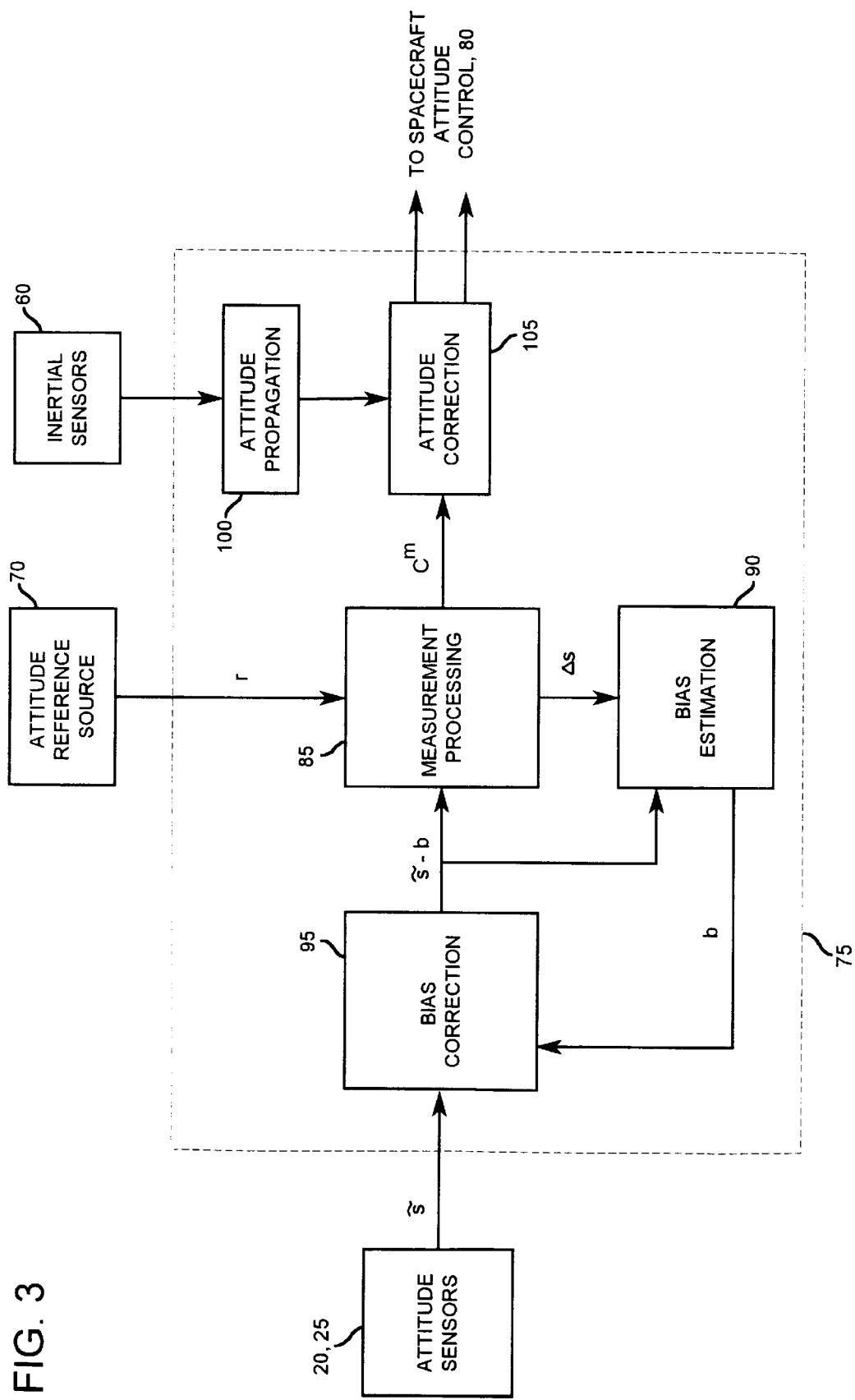
FIG. 3 is a block diagram showing detail of the spacecraft control processor shown in FIGS. 1 and 2.

FIG. 3 is a block diagram showing further detail of the spacecraft attitude determination block 75 of FIG. 2. The spacecraft attitude determination block 75 includes, a measurement processing block 85, a bias estimation block 90, a bias correction block 95, an attitude propagation block 100, and an attitude correction block 105.

The measurement processing block 85 receives input signals $\bar{s}$–b and r from the bias correction block 95 and the reference source 70, respectively. The measurement processing block 85 computes measurement residuals $\Delta S$, which represent the difference between the attitude as measured by the attitude sensors 20, 25 and the attitude as calculated using the output of the attitude reference source 70. Measurement residuals are representations of the bias present in the attitude sensor measurements. Details on the calculation of measurement residuals will be given with respect to FIG. 5. The measurement residuals are coupled to the bias estimation block 90. The measurement processing block 85 also calculates a spacecraft attitude measurement ($C^m$) and outputs the measurement to both the bias estimation block 90 and the attitude correction block 105. Using the spacecraft attitude measurement ($C^m$) and the measurement residuals $\Delta S$ the bias estimation block 90 computes bias estimates b, which are coupled to the bias correction block 95. The bias correction block 95 serves as a summing point for attitude sensor 20, 25 outputs and bias estimates from the bias estimation block 90. The goal is that the bias estimates are such that, when subtracted from the attitude sensor inputs, the biases of the sensors are removed.

The inertial sensors 60 are coupled to the attitude propagation block 100, which performs the function of interpreting the inertial sensors 60 and calculating a spacecraft attitude measurement. The inertial sensors 60 are necessary because the attitude sensors are not always able to access their reference sources, due to the limited field of view of the sensors. For example, a sun sensor will not be able to see the sun when the sun is outside of the field of view of the sensor, or when the earth is between the sun and the sensor. These situations leave the attitude measurement hardware with only one reference point. As mentioned previously, two points of reference are needed for attitude determination. Performance considerations may also dictate the need for inertial sensors. That is, due to noise in attitude sensor measurements, inertial sensors may be needed to add precision to attitude measurements. The inertial sensors 60 and the attitude propagation block 100 serve to keep the satellite in proper attitude when attitude sensors 20, 25 cannot access their appropriate reference sources, or when precise attitude measurements are needed.

Figure 4:
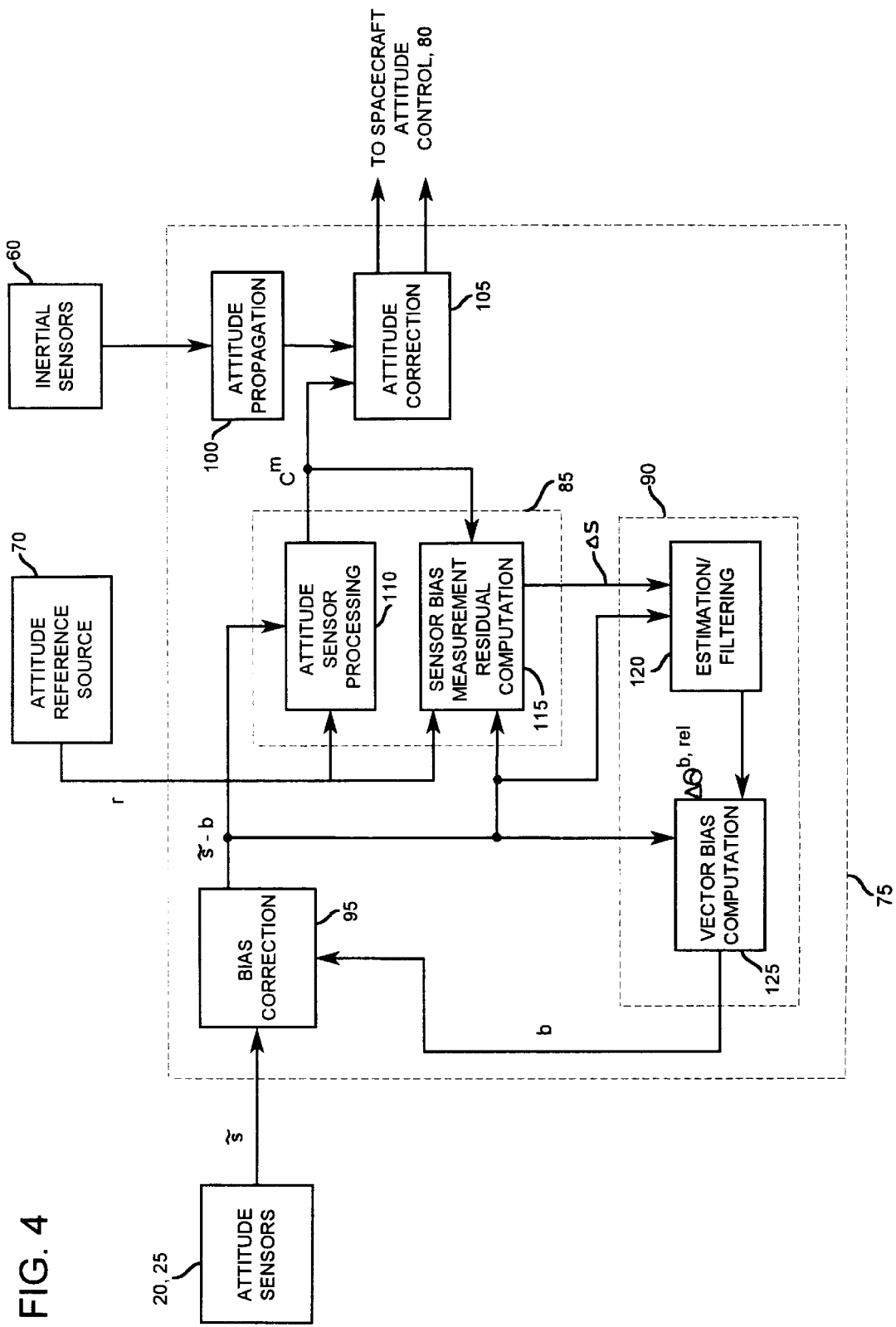
FIG. 4 is a block diagram showing detail of the measurement processing and bias estimation blocks shown in FIG. 3.

FIG. 4 is a block diagram showing further detail of the measurement processing block 85 and the bias estimation block 90. The measurement processing block 85 contains an attitude sensor processing block 110 and a sensor bias measurement residual computation (SBMRC) block 115. The attitude sensor processing block 110 uses the output of the bias correction block 95 and the output of the attitude reference source 70 to calculate the spacecraft attitude measurement ($C^m$). The spacecraft attitude measurement ($C^m$) is passed to the attitude correction block 105 and the SBMRC block 115. The SBMRC block 115 uses the spacecraft attitude measurement from the attitude sensor processing block 110, reference signals from the attitude reference source 70, and output s̃−b from the bias correction block 95 to calculate measurement residuals ΔS, which are representative of attitude sensor biases.

The measurement residuals from block 115 and output s̃−b from the bias correction block 95 are used by the estimation/filtering block 120 to calculate angle bias $\Delta\theta^{b,rel}$. $\Delta\theta^{b,rel}$ is the relative bias of the attitude, represented by Euler angles. Based on the angle bias and the output s̃−b from the bias correction block 95, the vector bias computation block 125 calculates a bias vector, b. Details on the calculation of the bias vector and the angle bias will be given in the description of the functionality of FIG. 5. When the bias vector is subtracted from the output of the attitude sensors 20, 25, (in the bias correction block 95) the bias of the attitude sensors 20, 25 is removed.

Figure 5:
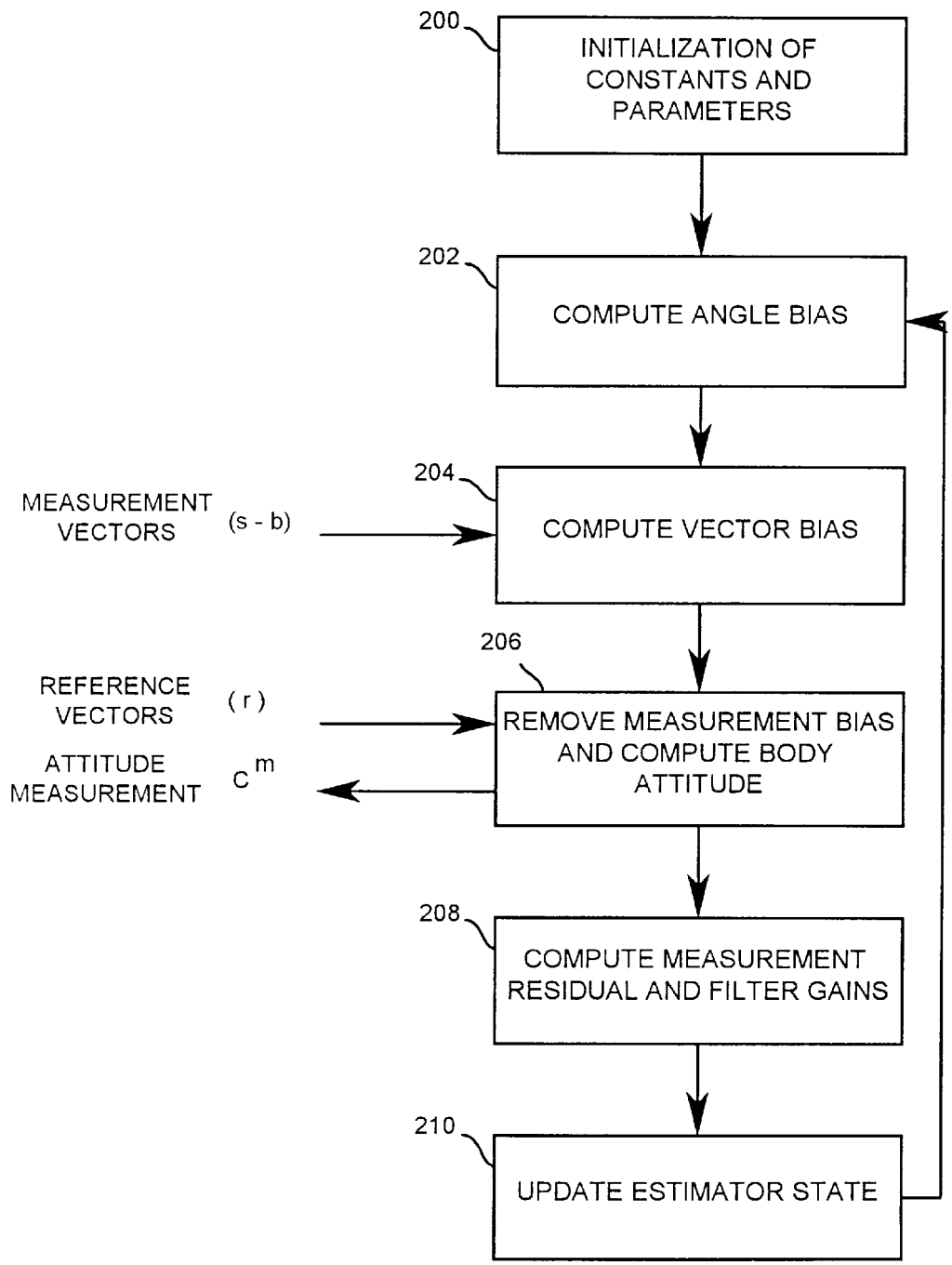
FIG. 5 is a flow chart representation of the functionality of the present invention.

FIG. 5 shows a flow chart for the sensor bias method of the present invention. The method of the present invention is executed by the spacecraft attitude determination block 75. More specifically, the measurement processing block 85, the bias estimation block 90, and the bias correction block 95 of the spacecraft attitude determination block 75 collectively perform the functionality shown in FIG. 5. The following is a description of the functionality contained in the bias method.

A block 200 initializes all constants and parameters used by the method of the present invention. Initialization takes place in the measurement processing block 85, the bias estimation block 90, and the bias correction block 95. Initialization may include initializing an estimator state $\hat{x}(0)=\hat{x}_0$, setting up estimator state parameters (Φ and G), setting up bias distribution parameters $[a_{k,i}]$, and initializing filter gains ($K_R$). The initial estimator state $\hat{x}_0$ is typically zero. However, if some prior knowledge of the estimator state exists, this knowledge may be represented as the initial state of the estimator. The bias distribution parameters $[a_{k,i}]$ must conform to the conditions as stated in equation (1).

$$\sum_{k=1}^{n} p_k a_{k,i} = 0, \sum_{k=1}^{n} p_k = 1, p_k \geq 0 \text{ where } i = 1, \ldots, m \quad (1)$$

Note that a particular estimation scheme may be unique to each application of the method of the present invention. Estimation schemes using fixed or variable gain estimators may be used with the present invention. A variety of estimation schemes are well known in the art.

After initialization has taken place, it is necessary to compute angle bias. This is done by a block 202, the functionality of which is contained in the estimation/filtering block 120 of the bias estimation block 90. Angle bias is computed using equation (2), where $\Delta\theta^{b,rel}$ is the relative bias of the attitude represented by Euler angles, G is the bias model, and $\hat{x}$ is the current estimator state.

$$\Delta\theta^{b,rel} = G\hat{x} \quad (2)$$

Using the bias distribution parameter and the current estimator state, with input from the attitude sensors 20, 25, a block 204 computes vector bias. The computation of vector bias is done in the vector bias computation block 125 contained in the bias estimation block 90. First, the bias is distributed as shown in equation (3). The computation of the bias vector follows from the distributed bias and the relative bias Euler angles, which were previously calculated. The bias vector b is calculated as shown in equation (4). Note that the bias vector is a concatenation of all measurement biases $b_1 \ldots b_n$. After calculation of the measurement bias is complete, control is transferred to a block 206.

$$[\tilde{s}]^b = \begin{matrix} a_{1,1}\tilde{s}_1 x & \ldots & a_{1,m}\tilde{s}_1 x \\ \ldots & \ldots & \ldots \\ a_{n,1}\tilde{s}_n x & \ldots & a_{n,m}\tilde{s}_n x \end{matrix} \quad (3)$$

$$b=[\tilde{s}]^b \Delta\theta^{b,rel} \quad (4)$$

Block 206 performs the function of removing measurement bias and computing body attitude. The removal of measurement bias is done in the bias correction block 95. The bias vector b is then combined with the attitude sensor 20, 25 outputs. This serves to cancel the bias in the sensor measurements with the bias vector. That is, s̃ is replaced by s̃−b, which removes the bias from the attitude sensor measurement. Block 206 also performs the function of computing the body attitude. Note that the computation of the body attitude $C^m$ is done after the bias removal. The calculation of body attitude is performed in the attitude sensor processing block 110 of the measurement processing block 85. The method of attitude calculation is dependent on the particular application, and several suitable attitude calculation methods are well known in the art.

Block 208 performs the function of computing measurement residuals and estimator gains. The calculation of measurement residuals takes place in the measurement processing block 50. Measurement residuals are calculated by the measurement residual computation block 115, as shown in equation (5). Wherein, $\tilde{s}_k-b_k$ is the bias-removed sensor measurement, $C^m$ is the body attitude, and $r_k$ are the reference vectors from the reference source 32. The computation of estimator gains are mathematically represented by equation (6). Estimator gain calculations are well known in the art and may be chosen from a variety of techniques including, for example, Kalman filtering. After the computation of measurement residuals and filter gains, program control is passed to a block 210.

$$\Delta s_k=(\tilde{s}_k-b_k)-C^m r_k \text{ where } k=1, \ldots, n \quad (5)$$

$$K=K_R^{-1}([\tilde{s}]^b G)^T \quad (6)$$

Based on the current estimator state, the state transition matrix, calculated filter gains, and measurement residuals, a block 210 updates the estimator state. The calculation of the new estimator state is based on equation (7).

$$\hat{x} \leftarrow \Phi\hat{x}+K\Delta s \quad (7)$$

Having updated the estimator state in block 210, program control is passed back to block 202. The method continually loops to update the bias estimates in order to offset bias that may be present in the sensor measurements.

Of course, it should be understood that a range of changes and modifications can be made to the preferred embodiment described above. For example, various bias models and bias distribution schemes may be used in conjunction with the present invention. Additionally, any attitude sensors or bias attribution schemes may be used with the present invention. There also exists a wide range of attitude measurement methods that may use the method and apparatus of the present invention. For example, the present invention may be employed by an number of known attitude measurement methods, such as TRIAD™ or QUEST™.

It is therefore intended that the foregoing detailed description be regarded as illustrative rather than limiting and that it be understood that it is the following claims, including all equivalents, which are intended to define the scope of this invention.

What is claimed is:

1. A spacecraft attitude sensor error correction apparatus comprising:
    an attitude sensor that generates attitude-related position information based on a position of said attitude sensor with respect to a reference object, wherein said attitude-related position information contains a measurement error;
    an attitude reference source that generates reference position information regarding a position of said reference object with respect to a reference coordinate system based on temporal information;
    a spacecraft control processor that receives said attitude-related position information, along with said reference position information, and generates a measurement error estimate of said measurement error present in said attitude-related position information, and said spacecraft control processor using said measurement error estimates to null said measurement error present in said attitude-related position information;
    a bias correction block that receives said attitude-related position information from said attitude sensor and said measurement error estimate, and generates a difference signal representative of said difference between said attitude-related position information and said measurement error estimate;
    a measurement processing block that receives said reference position information and said difference signal and generates a spacecraft attitude estimate and measurement residuals; and
    a bias estimation block that receives said difference signal and said measurement residuals and generates said measurement error estimate that is used by said bias correction block.

2. The spacecraft attitude sensor error correction apparatus of claim 1, further comprising:
    an inertial sensor that generates body rates based on spacecraft acceleration;
    a spacecraft attitude determination block in communication with said attitude reference source, said inertial sensor and said attitude sensor, said spacecraft attitude determination block generating a spacecraft attitude estimate; and
    a spacecraft attitude control block receiving said spacecraft attitude estimate and generating a control command.

3. The spacecraft attitude sensor error correction apparatus of claim 2, wherein said control command is coupled to an actuator.

4. The spacecraft attitude sensor error correction apparatus of claim 3, wherein said actuator comprises a reaction wheel.

5. The spacecraft attitude sensor error correction apparatus of claim 1, further comprising:
    an attitude sensor processing block that receives said difference signal and said reference position information and generates said spacecraft attitude estimate; and
    a sensor bias measurement residual computation block that receives said difference signal, said spacecraft attitude estimate, and said reference position information and generates said measurement error estimate.

6. The spacecraft attitude sensor error correction apparatus of claim 1, further comprising:
    an estimation/filtering block that receives said difference signal and said measurement error estimate and generates a representation of a relative attitude error represented by Euler angles; and
    a vector bias computation block that receives said difference signal and said representation of said relative attitude error represented by Euler angles and generates said measurement error estimate.

7. The spacecraft attitude sensor error correction apparatus of claim 1, wherein said measurement error present in said attitude-related position information comprises a time varying component.

8. The spacecraft attitude sensor error correction apparatus of claim 1, wherein said measurement error present in said attitude-related position information comprises a time invariant component.

9. The spacecraft attitude sensor error correction apparatus of claim 1, wherein said attitude reference source comprises an ephemeris system.

10. A spacecraft attitude sensor error correction apparatus comprising:
    an attitude sensor that generates attitude-related position information based on a position of said attitude sensor with respect to a reference object, wherein said attitude-related position information contains a measurement error;
    an attitude reference source that generates reference position information regarding a position of said reference object with respect to a reference coordinate system based on temporal information;
    a spacecraft control processor that receives said attitude-related position information, along with said reference position information, and generates a measurement error estimate of said measurement error present in said attitude-related position information, and said spacecraft control processor using said measurement error estimates to null said measurement error present in said attitude-related position information;
    an inertial sensor that generates body rates in spacecraft acceleration;
    a spacecraft attitude determination block in communication with said attitude reference source, said inertial sensor and said attitude sensor, said spacecraft attitude determination block generating a spacecraft attitude estimate;
    a spacecraft attitude control block receiving said spacecraft attitude estimate and generating a control command;
    wherein said spacecraft attitude determination block further comprises:
        an attitude propagation block that receives said body rates from inertial sensor and interprets said body rates to generate a spacecraft attitude measurement; and
        an attitude correction block that receives said spacecraft attitude estimate and said spacecraft attitude measurement and that generates spacecraft attitude and body rate signals that are coupled to said spacecraft attitude control block.

11. A method of correcting spacecraft attitude sensor error, comprising the steps of:
    obtaining attitude sensor measurements from an attitude sensor, wherein said attitude sensor measurements contain a measurement error;
    computing angle bias based on a bias model and an estimator state;

computing a bias vector by distributing said measurement error and combining said distributed measurement error with said angle bias; and removing said measurement error by subtracting said bias vector from said attitude sensor measurements.

12. The method of correcting spacecraft attitude sensor error of claim 11, wherein said step of computing angle bias comprises multiplying said bias model and said estimator state.

13. The method of correcting spacecraft attitude sensor error of claim 12, wherein said angle bias is represented using Euler angles.

14. The method of correcting spacecraft attitude sensor error of claim 11, wherein said bias model is time varying.

15. The method of correcting spacecraft attitude sensor error of claim 11, further comprising the steps of:

computing spacecraft attitude;

computing measurement residuals using reference position information regarding a position of a reference object with respect to a reference coordinate system generated by an attitude reference source;

calculating estimator gains; and updating said estimator state.

16. The method of correcting spacecraft attitude sensor error of claim 15, wherein said step of computing said estimator gains is performed using Kalman filtering.

17. The method of correcting spacecraft attitude sensor error of claim 15, wherein the spacecraft attitude is represented by a cosine matrix.

18. The method of correcting spacecraft attitude sensor error of claim 11, where in said bias model is time invariant.

* * * * *